(12) United States Patent
Wilcox

(10) Patent No.: US 10,507,514 B2
(45) Date of Patent: Dec. 17, 2019

(54) RIVET FEEDING APPARATUS

(71) Applicant: Arconic Inc., Pittsburgh, PA (US)

(72) Inventor: Robert Wilcox, Port Ewen, NY (US)

(73) Assignee: Arconic Inc., Pittsburgh, PA (US)

( * ) Notice: Subject to any disclaimer, the term of this patent is extended or adjusted under 35 U.S.C. 154(b) by 406 days.

(21) Appl. No.: 15/266,331

(22) Filed: Sep. 15, 2016

(65) Prior Publication Data

US 2017/0072454 A1 Mar. 16, 2017

Related U.S. Application Data

(60) Provisional application No. 62/219,206, filed on Sep. 26, 2015.

(51) Int. Cl.
*B21J 15/32* (2006.01)
*B23K 11/00* (2006.01)
(Continued)

(52) U.S. Cl.
CPC ............ *B21J 15/32* (2013.01); *B23K 11/0053* (2013.01); *B23K 11/115* (2013.01); *B23K 11/36* (2013.01);
(Continued)

(58) Field of Classification Search
CPC ......... B21J 15/32; B21J 15/323; B25C 1/001; B23K 11/36; B23K 11/115;
(Continued)

(56) References Cited

U.S. PATENT DOCUMENTS 1,333,414 A 3/1920 Havener
1,730,750 A * 10/1929 Stimpson ............... A43D 69/02
227/139

(Continued)

FOREIGN PATENT DOCUMENTS

CN 101375066 A 2/2009
CN 101653861 A 2/2010
(Continued)

OTHER PUBLICATIONS

Extended European Search Report dated Jan. 5, 2018, issued by the European Patent Office in European Patent Application No. 15788691.2.

(Continued)

*Primary Examiner* — Robert F Long
(74) *Attorney, Agent, or Firm* — Greenberg Traurig, LLP

(57) ABSTRACT

A fastener feed apparatus includes a mounting portion and a feed portion attached movably thereto. The feed portion includes a feed body having first and second ends and an internal track extending therethrough. The internal track is sized and shaped to convey a fastener through the feed body. The feed portion also includes a feeding block attached to the second end of the feed body and including a body and a pair of feed fingers, each of which includes a first end attached to the body and a second end. A track is formed between the feed fingers, is sized and shaped to convey the fastener from its first end to its second end, and is contiguous with the internal track of the feed body. The second end of the track includes a retention point. The feed fingers are sized and shaped to retain the fastener at the retention point.

34 Claims, 4 Drawing Sheets

(51) Int. Cl.
  *B23P 19/00* (2006.01)
  *B23K 11/11* (2006.01)
  *B23K 11/36* (2006.01)
  *B23K 103/04* (2006.01)
  *B23K 103/10* (2006.01)
  *B23K 103/16* (2006.01)

(52) U.S. Cl.
  CPC ........ *B23P 19/006* (2013.01); *B23K 2103/04* (2018.08); *B23K 2103/10* (2018.08); *B23K 2103/16* (2018.08)

(58) Field of Classification Search
  CPC ............ B23K 11/0053; B23K 2103/16; B23K 2103/10; B23K 2103/04; B23P 19/006
  USPC ..... 173/1–2, 13, 31, 38–39, 45–56, 90, 130, 173/133, 121, 162, 170–171; 227/107–156
  See application file for complete search history.

(56) References Cited

U.S. PATENT DOCUMENTS

| | | | |
|---|---|---|---|
| 2,302,772 A | 11/1942 | Huck | |
| 2,319,455 A | 5/1943 | Hardman et al. | |
| 2,563,107 A | 8/1951 | Fanger | |
| 2,569,059 A | 9/1951 | Huff et al. | |
| 3,095,951 A | 7/1963 | Rood et al. | |
| 3,104,312 A | 9/1963 | Gentry | |
| 3,400,509 A | 9/1968 | Setzer | |
| 3,576,964 A | 5/1971 | Williams | |
| 3,774,009 A | 11/1973 | Hodges | |
| 3,858,024 A | 12/1974 | Hinden et al. | |
| 4,119,827 A | 10/1978 | Lenox | |
| 4,650,951 A | 3/1987 | Koga et al. | |
| 4,677,473 A | 6/1987 | Okamoto et al. | |
| 4,736,861 A | 4/1988 | Basili | |
| 5,030,814 A | 7/1991 | Tange et al. | |
| 5,273,386 A | 12/1993 | Luhm | |
| 5,339,984 A * | 8/1994 | Schmidt | A41H 37/00 221/124 |
| 5,426,838 A * | 6/1995 | Korb | A41H 37/02 227/18 |
| 5,473,134 A | 12/1995 | Susgin | |
| 5,697,521 A | 12/1997 | Dixon | |
| 5,739,498 A | 4/1998 | Sunamoto et al. | |
| 5,939,498 A | 8/1999 | Sutton, Jr. et al. | |
| 6,037,559 A | 3/2000 | Okabe et al. | |
| 6,054,668 A | 4/2000 | Van Otteren et al. | |
| 6,244,899 B1 * | 6/2001 | Bogursky | H01R 12/57 206/713 |
| 6,291,792 B1 | 9/2001 | Fussnegger | |
| 6,414,261 B1 | 7/2002 | Maetschke | |
| 6,515,251 B1 | 2/2003 | Wind | |
| 6,796,454 B1 | 9/2004 | Matthews et al. | |
| 6,908,022 B2 * | 6/2005 | Schmitz | B25C 5/1693 227/119 |
| 6,926,186 B2 * | 8/2005 | Wells | B25C 5/11 173/90 |
| 6,942,134 B2 * | 9/2005 | Naito | B21J 15/025 227/107 |
| 7,030,333 B2 | 4/2006 | Bradley | |
| 7,176,401 B2 | 2/2007 | Sakoda | |
| 7,267,736 B2 | 9/2007 | Hou et al. | |
| 7,344,058 B2 * | 3/2008 | Bruins | B25C 5/1693 227/119 |
| 7,645,105 B2 | 1/2010 | Hengel et al. | |
| 7,870,656 B2 | 1/2011 | Eberlein | |
| 7,880,112 B2 | 2/2011 | Hengel et al. | |
| 8,413,740 B2 * | 4/2013 | Rodenhouse | B25B 21/002 173/213 |
| 8,424,961 B2 | 4/2013 | Carsley et al. | |
| 8,461,484 B2 | 6/2013 | Tetzlaff et al. | |
| 8,466,386 B2 | 6/2013 | Wang | |
| 8,552,332 B2 | 10/2013 | Aoyama | |
| 8,595,914 B2 | 12/2013 | Koppitz et al. | |
| 8,920,095 B2 | 12/2014 | Baugh, Sr. | |
| 8,973,248 B2 | 3/2015 | Honnikoppa | |
| 9,012,029 B2 | 4/2015 | Lang et al. | |
| 9,021,688 B2 | 5/2015 | Krejci | |
| 9,067,276 B2 | 6/2015 | Koppitz et al. | |
| 9,174,298 B2 | 11/2015 | Kasukawa et al. | |
| 2001/0054635 A1 * | 12/2001 | Schmitz | B25C 5/1693 227/15 |
| 2002/0134817 A1 | 9/2002 | Shepard | |
| 2003/0102350 A1 * | 6/2003 | Liu | B25C 5/1693 227/18 |
| 2004/0022603 A1 | 2/2004 | Litwinski et al. | |
| 2004/0169017 A1 | 9/2004 | Sakoda | |
| 2004/0217144 A1 * | 11/2004 | Matthews | B21J 15/025 227/119 |
| 2005/0133483 A1 | 6/2005 | Hou et al. | |
| 2005/0161442 A1 | 7/2005 | Bradley | |
| 2005/0284910 A1 * | 12/2005 | Craythorn | B21J 15/32 227/112 |
| 2006/0213954 A1 | 9/2006 | Ruther et al. | |
| 2007/0158383 A1 * | 7/2007 | Cheng | B25C 5/06 227/30 |
| 2007/0295698 A1 | 12/2007 | Hengel et al. | |
| 2008/0085568 A1 | 4/2008 | Wang et al. | |
| 2008/0193255 A1 | 8/2008 | Hengel et al. | |
| 2008/0229570 A1 | 9/2008 | Koppitz et al. | |
| 2008/0296267 A1 | 12/2008 | Hill | |
| 2009/0128625 A1 | 5/2009 | Loipetsberger | |
| 2009/0139821 A1 | 6/2009 | Koppitz et al. | |
| 2009/0260413 A1 | 10/2009 | Tomchick | |
| 2009/0261075 A1 | 10/2009 | Aoyama et al. | |
| 2009/0294410 A1 | 12/2009 | Iwase et al. | |
| 2010/0084380 A1 | 4/2010 | Tetzlaff et al. | |
| 2010/0140243 A1 | 6/2010 | Roddy et al. | |
| 2011/0097142 A1 | 4/2011 | Bassler et al. | |
| 2011/0159313 A1 | 6/2011 | Kasukawa et al. | |
| 2011/0214268 A1 | 9/2011 | Zander | |
| 2011/0225800 A1 * | 9/2011 | Lacy | B25C 5/11 29/525.01 |
| 2012/0241216 A1 | 9/2012 | Coppeta et al. | |
| 2013/0071209 A1 * | 3/2013 | Schug | B23P 19/005 414/222.01 |
| 2013/0122327 A1 | 5/2013 | Sheu et al. | |
| 2013/0189023 A1 | 7/2013 | Spinella et al. | |
| 2013/0247672 A1 | 9/2013 | Lev et al. | |
| 2013/0270229 A1 | 10/2013 | Pedersen et al. | |
| 2013/0309520 A1 | 11/2013 | Lang et al. | |
| 2014/0076913 A1 * | 3/2014 | Neumeier | B65D 83/02 221/1 |
| 2014/0096366 A1 | 4/2014 | Honnikoppa | |
| 2015/0000956 A1 | 1/2015 | Spinella | |
| 2015/0001187 A1 | 1/2015 | Spinella | |
| 2015/0001189 A1 | 1/2015 | Spinella et al. | |
| 2015/0144602 A1 | 5/2015 | Draht et al. | |
| 2015/0165544 A1 | 6/2015 | Mesa et al. | |
| 2015/0184689 A1 | 7/2015 | Godfrey | |
| 2015/0217395 A1 | 8/2015 | Spinella et al. | |
| 2015/0258624 A1 | 9/2015 | Draht et al. | |
| 2015/0317786 A1 | 11/2015 | Spinella et al. | |
| 2015/0330884 A1 | 11/2015 | Spinella et al. | |
| 2016/0158873 A1 | 6/2016 | Amedick et al. | |
| 2016/0167158 A1 | 6/2016 | Spinella et al. | |
| 2017/0023038 A1 | 1/2017 | Izuhara | |
| 2017/0316556 A1 | 11/2017 | Spinella et al. | |

FOREIGN PATENT DOCUMENTS

| | | |
|---|---|---|
| CN | 101890564 A | 11/2010 |
| CN | 101590598 A | 3/2015 |
| CN | 204221184 U | 3/2015 |
| DE | 42 40 823 | 10/1993 |
| DE | 4237361 | 9/1996 |
| DE | 100 59 659 | 6/2002 |
| DE | 102004025493 | 12/2005 |
| DE | 102005006253 | 3/2007 |
| DE | 102007036416 | 2/2009 |

(56) References Cited

FOREIGN PATENT DOCUMENTS

| | | |
|---|---|---|
| DE | 102004025492 | 8/2009 |
| DE | 102009044888 | 6/2011 |
| DE | 102010006670 | 8/2011 |
| DE | 102010026040 | 1/2012 |
| DE | 102010034183 | 2/2012 |
| DE | 10060390 | 4/2012 |
| DE | 102011055044 | 5/2013 |
| DE | 10 2012 010 870 A1 | 12/2013 |
| DE | 102012013589 | 1/2014 |
| DE | 10 2012 018 866 A1 | 3/2014 |
| DE | 102012013325 | 10/2014 |
| DE | 102014211222 | 12/2015 |
| EP | 0865860 A1 | 9/1998 |
| EP | 2671662 | 12/2013 |
| EP | 2722124 | 4/2014 |
| EP | 3031564 | 6/2016 |
| EP | 3023650 B1 | 9/2017 |
| GB | 964117 | 7/1964 |
| GB | 1528730 A | 10/1979 |
| JP | H07-185832 | 7/1995 |
| JP | 7-214338 | 8/1995 |
| JP | 8-132252 | 5/1996 |
| JP | H11-13395 | 1/1999 |
| JP | 11-209837 | 8/1999 |
| JP | 11-315335 | 11/1999 |
| JP | 2000-117458 | 4/2000 |
| JP | 2000-144290 A | 5/2000 |
| JP | 2001-274271 A | 10/2001 |
| JP | 2001-274548 A | 10/2001 |
| JP | 2003-293060 A | 10/2003 |
| JP | 2005-161352 A | 6/2005 |
| JP | 2007-7731 A | 1/2007 |
| JP | 2009-183975 | 8/2009 |
| JP | 2009-285678 A | 12/2009 |
| JP | 20100025615 | 2/2010 |
| JP | 2010-168622 A | 8/2010 |
| JP | 2010207898 A | 9/2010 |
| JP | 2011-50977 A | 3/2011 |
| JP | 2012103136 | 5/2012 |
| JP | 2012-204692 A | 10/2012 |
| JP | 2015-62916 | 4/2015 |
| JP | 2016-183217 | 10/2016 |
| WO | 2006084609 | 8/2006 |
| WO | 2009135553 A1 | 11/2009 |
| WO | 2011095191 | 8/2011 |
| WO | 2012041515 | 4/2012 |
| WO | 2012041516 | 4/2012 |
| WO | 2013064618 | 5/2013 |
| WO | 2013/096669 A2 | 6/2013 |
| WO | 2013102572 | 7/2013 |
| WO | 2013/178542 A1 | 12/2013 |
| WO | 2014/048885 A2 | 4/2014 |
| WO | 2014/167566 | 10/2014 |
| WO | 2014210266 | 12/2014 |
| WO | 2014210278 | 12/2014 |
| WO | 2015117059 | 8/2015 |
| WO | 2016100179 | 6/2016 |

OTHER PUBLICATIONS

International Search Report and Written Opinion dated Nov. 15, 2017, issued by the European Patent Office in International Application No. PCT/US2017/024093 (22 pages).
European Aluminum Association, The Aluminum Automotive Manual, Joining Dissimilar Materials, (2015), pp. 1-31.
Meschut, G. et al., Hybrid technologies for joining ultra-high-strength boron steels with aluminum alloys for lightweight car body strucctures, Procedia CIRP, 23, (2014), pp. 19-23.
International Search Report and Written Opinion of the International Searching Authority dated Feb. 16, 2016, regarding International Patent Application No. PCT/US2015/065491.
International Search Report and Written Opinion of the International Searching Authority dated Jun. 10, 2015 in reference to International Patent Application No. PCT/US2015/014062.
International Search Report and Written Opinion of the International Searching Authority dated Oct. 30, 2014 in reference to International Patent Application No. PCT/US2014/044267.
International Search Report and Written Opinion of the International Searching Authority dated Oct. 30, 2014 in reference to International Patent Application No. PCT/US2014/044286.
PCT Application No. PCT/US15/65491 filed Dec. 14, 2015.
Weickum, B., "Friction Bit Joining of 5754 Aluminum to DP980 Ultra-High-Strength Steel: A Feasibility Study, All Theses and Dissertations", (2011), Paper 2789.
FDS, Produkte, Verbindungstechnik, EJOT Industrie, <http://www.industrie.ejot.de/Verbindungstechnik/Produkte/FDS%3Csup%3E%26reg%3B%3C-sup%3E/p/VBT_FDS>.
International Search Report and Written Opinion of the International Searching Authority dated Dec. 21, 2016 in reference to International Patent Application No. PCT/US2016/051870.
Main Alloys Cast and Chemical Composition, http://www.sssmile.com.tw/.

* cited by examiner

RIVET FEEDING APPARATUS

CROSS-REFERENCE TO RELATED APPLICATION

This application is a Section 111(a) application relating to and claiming the benefit of commonly owned, U.S. Provisional Patent Application No. 62/219,206, titled "RIVET FEEDING APPARATUS," having a filing date of Sep. 16, 2015, which is incorporated by reference herein in its entirety.

FIELD OF THE INVENTION

The present invention relates to a rivet feeding apparatus and, more particularly, a feeder for resistance spot weld rivets.

BACKGROUND OF THE INVENTION

Current methods of fastening workpieces such as sheets to one another include conventional spot welding, the use of self-piercing rivets, and the use of flow drill rivets. The latter two methods require feeding systems for the rivets. What is needed is a compact rivet feeding apparatus that fits within a limited space and does not employ complicated actuators and mechanisms, as well as an apparatus that provides robust means to hold a rivet in place that is not sensitive to environmental factors, such as dirt, carbon build-up, clogging, dust, and sparks.

SUMMARY OF THE INVENTION

In an embodiment, a fastener feed apparatus includes a mounting portion and a feed portion attached movably to the mounting portion. The feed portion includes a feed body and a feeding block. The feed body has a first end, a second end opposite the first end, and an internal track extending through the feed body from the first end to the second end. The internal track is sized and shaped to enable conveyance of a fastener therethrough from the first end to the second end. The feeding block includes a body and a pair of feed fingers, each of which includes a first end attached to the body and a free, second end opposite the first end of the feed finger. A track is formed between the feed fingers. The track includes a first end adjacent the first ends of the feed fingers and a second end adjacent the second ends of the feed fingers. The track is sized and shaped to convey the fastener from the first end of the track to the second end of the track. The track is contiguous with the internal track of the feed body. The second end of the track includes a retention point. The feed fingers are sized and shaped to enable retention of the fastener at the retention point.

In an embodiment, each of the feed fingers of the feeding block includes an inner guiding diameter portion located proximate to the second end thereof. The inner guiding diameter portions define a first distance therebetween. In an embodiment, the retention point of the track of the feeding block includes the inner guiding diameter portions. In an embodiment, each of the feed fingers of the feeding block includes an inner wall located proximate to the first end thereof. The inner walls of the feed fingers face one another and define a second distance therebetween. The second distance is greater than the first distance. In an embodiment, each of the feed fingers of the feeding block includes a stop point located proximate to the inner guiding diameter portions of the feed fingers and intermediate the inner guiding diameter portions and the second ends of the feed fingers. The stop points define a third distance therebetween. In an embodiment, the third distance is less than the first distance. In an embodiment, the feed fingers are sized and shaped to prevent them from flexing away from one another to an extent such that the fastener is free to pass between the stop points of the feed fingers when the fastener impacts the stop points after traveling along the internal track of the feed body from the first end of the feed body to the second end of the feed body and along the track of the feeding block from the first end of the feeding block to the second end of the feeding block. In an embodiment, the feed fingers are sized and shaped so as to enable them to flex away from one another to an extent such that the fastener is permitted to pass between the stop points of the feed fingers when the feed portion is operated to move away from a workpiece along first and second axes thereof.

In an embodiment, each of the feed fingers of the feeding block includes an anti-return point located proximate to the inner guiding diameter portions and intermediate the inner guiding diameter portions and the first ends of the feed fingers. The anti-return points of the feed fingers define a fourth distance therebetween. In an embodiment, the fourth distance is less than the first distance. In an embodiment, the feed fingers are sized and shaped so as to allow them to flex away from one another to an extent such that the fastener is permitted to pass between the anti-return points of the feed fingers.

In an embodiment, the feed portion includes a finger cover overlaying the second ends of the feed fingers. In an embodiment, the finger cover includes a bowl-shaped cavity overlaying the retention point of the feeding block. In an embodiment, the cavity is sized and shaped to receive a first fastening arm of a fastening apparatus. In an embodiment, the fastener feed apparatus also includes a linear actuator configured to move the feed portion relative to the mounting portion. In an embodiment, the fastener includes a rivet. In an embodiment, the fastener includes a plurality of rivets stacked among one another.

DETAILED DESCRIPTION OF THE DRAWINGS

Figure 1:
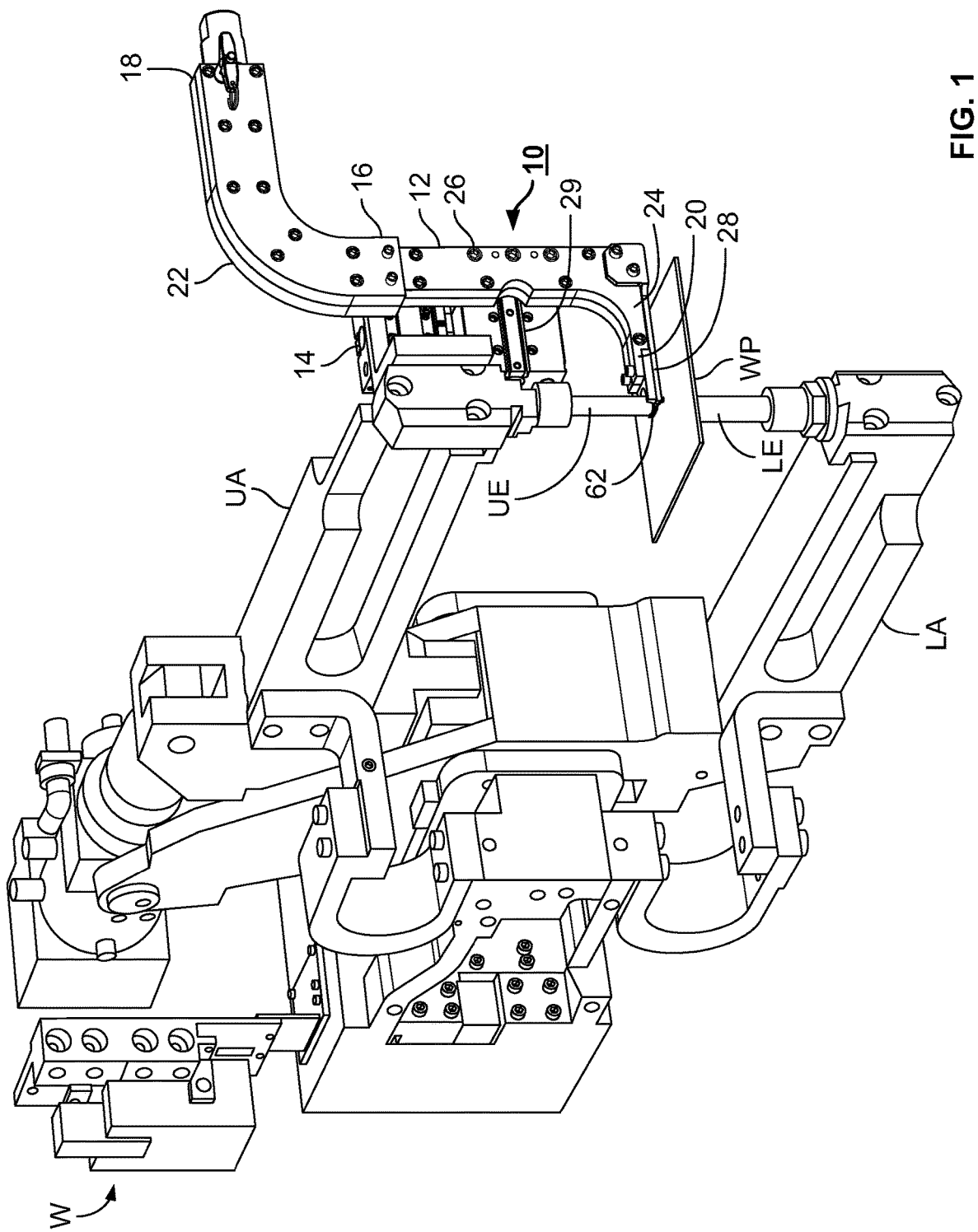
FIG. 1 illustrates a rivet feed system attached to a welding apparatus.
Figure 2:
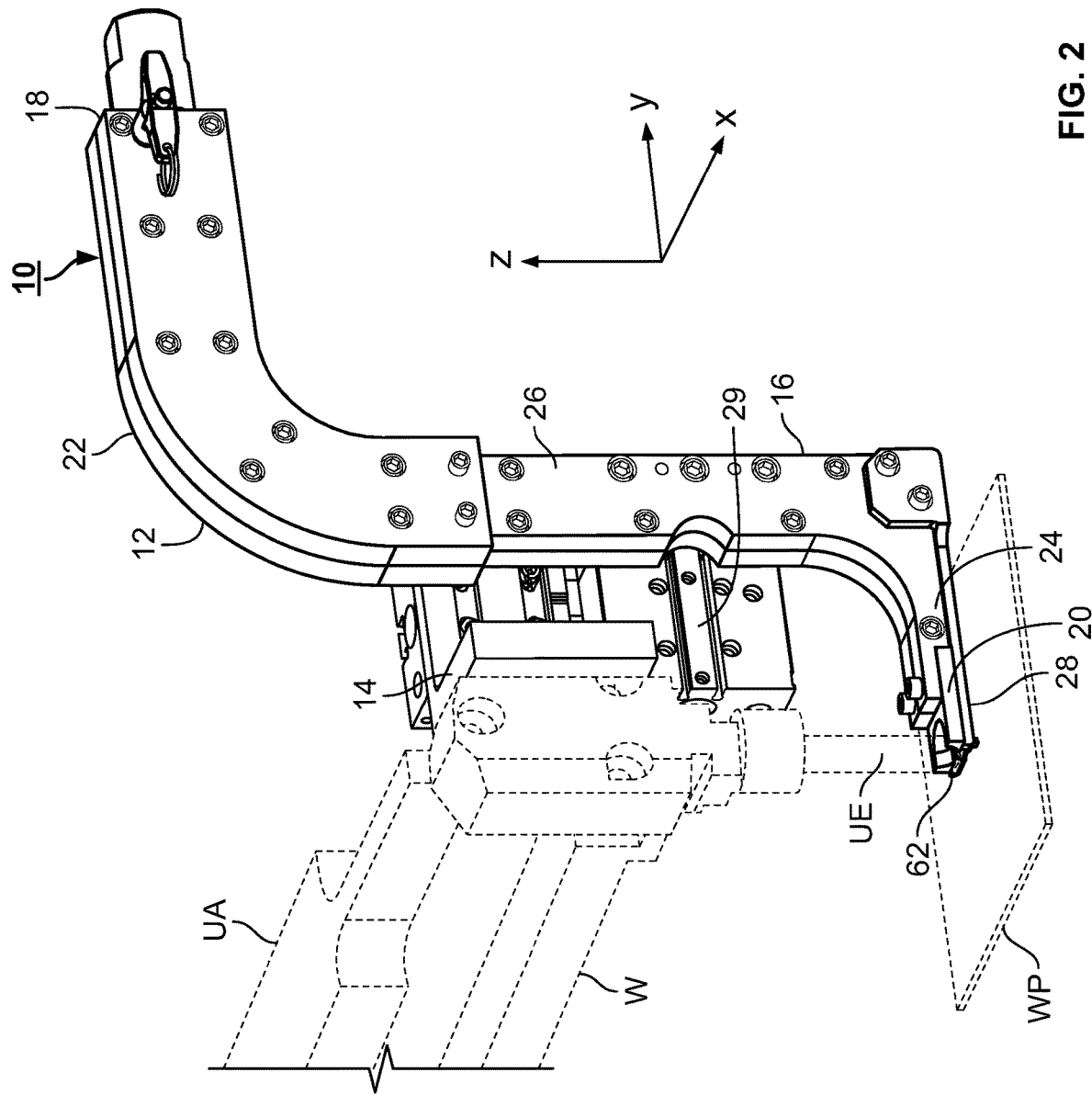
FIG. 2 illustrates a close-up view of the rivet feed system of FIG. 1.

FIG. 1 illustrates an embodiment of a rivet feed system 10 attached to a welding apparatus W, positioned with respect to a workpiece WP. FIG. 2 illustrates the rivet feed system 10, the workpiece WP, and a portion of the welding apparatus W of FIG. 1, with the rivet feed system 10 shown in solid lines and the workpiece WP and welding apparatus W shown in dashed lines. In an embodiment, the welding apparatus W is a pinch welder utilized in connection with resistance spot weld rivets (RSRs). In an embodiment, the welding apparatus W includes upper and lower resistance welding arms UA, LA that are spaced apart and opposed to one another. The resistance welding arm UA includes a corresponding upper welding electrode UE, while the resistance welding arm LA includes a corresponding lower welding electrode LE. When the welding apparatus W is in use, the upper welding electrode UE and the lower welding electrode LE are positioned on opposite sides of a workpiece WP.

Referring to FIGS. 1 and 2, the rivet feed system 10 includes a feed portion 12 and a mounting portion 14 (e.g., a mounting block). In an embodiment, the rivet feed system 10 is mounted to the welding apparatus W by attaching the mounting portion 14 to the upper resistance welding arm UA. In an embodiment, the feed portion 12 is generally "S"-shaped and includes a feed body 16 having a first (i.e., upper) end 18, a second (i.e., lower) end 20, a top curved portion 22 located at the first end 18, a horizontal bottom portion 24 located at the second end 20, and an intermediate vertical linear portion 26 extending from the top curved portion 22 to the horizontal bottom portion 24. In an embodiment, a feed track 27 (shown in FIG. 7) is located in the interior of the feed body 16 and extends from the first end 18 to the second end 20. In an embodiment, the feed track 27 is sized and shaped so as to allow the passage of a rivet R therethrough and to maintain the rivet R in a desired orientation during such passage. In one or more embodiments, the feed body 16 includes a pivoting mechanism or a linkage 29 that enables motion of the feed body 16 along the Y-axis in FIG. 2 (i.e., across the surface of a workpiece WP).

Figure 3:
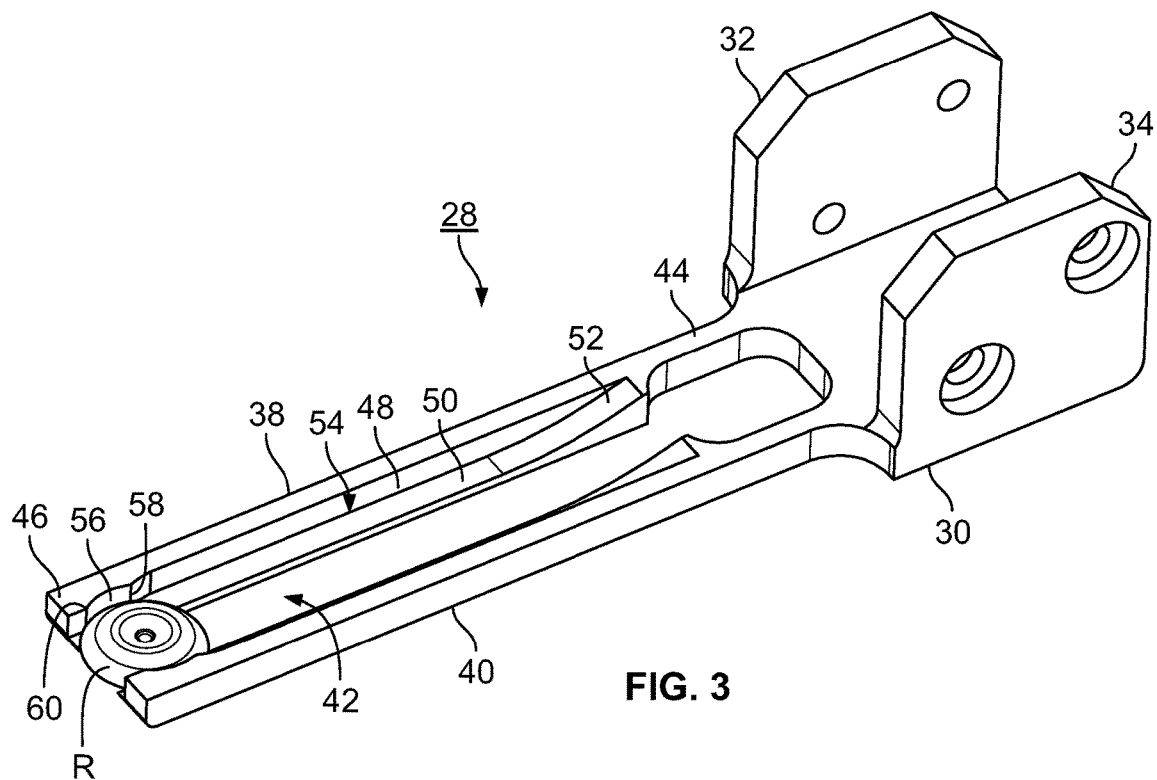
FIG. 3 illustrates a top perspective view of a feeding block employed by the rivet feed system shown in FIG. 2.
Figure 4:
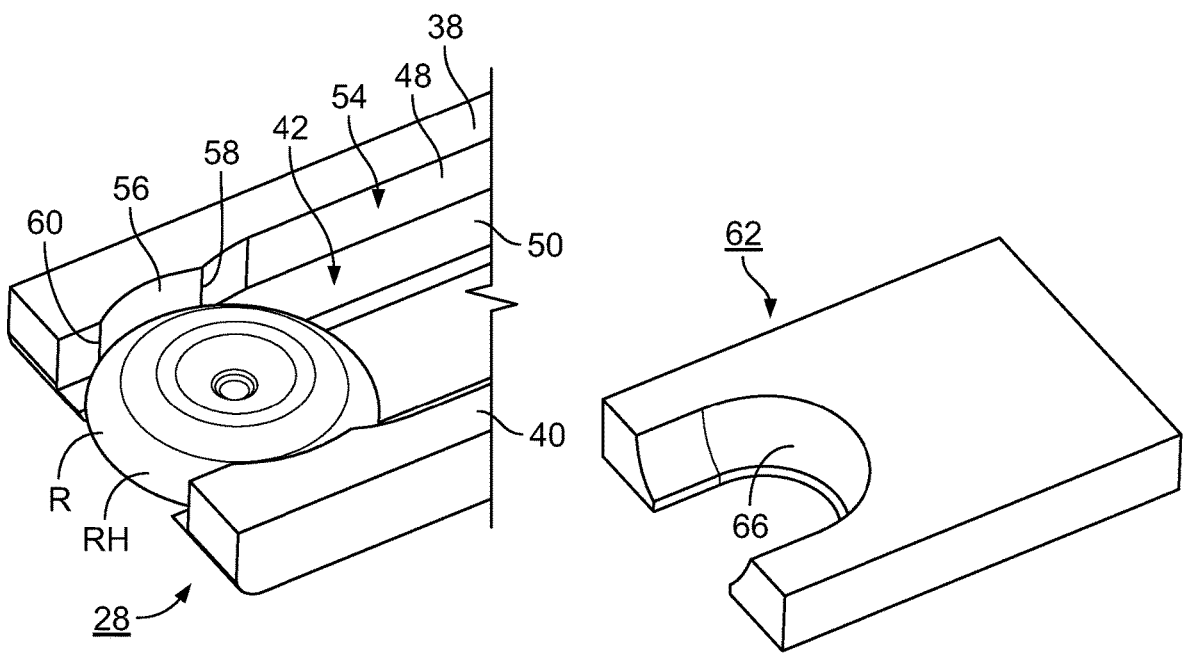
FIG. 4 illustrates a close-up view of one end of the feeding block shown in FIG. 3.
Figure 6:
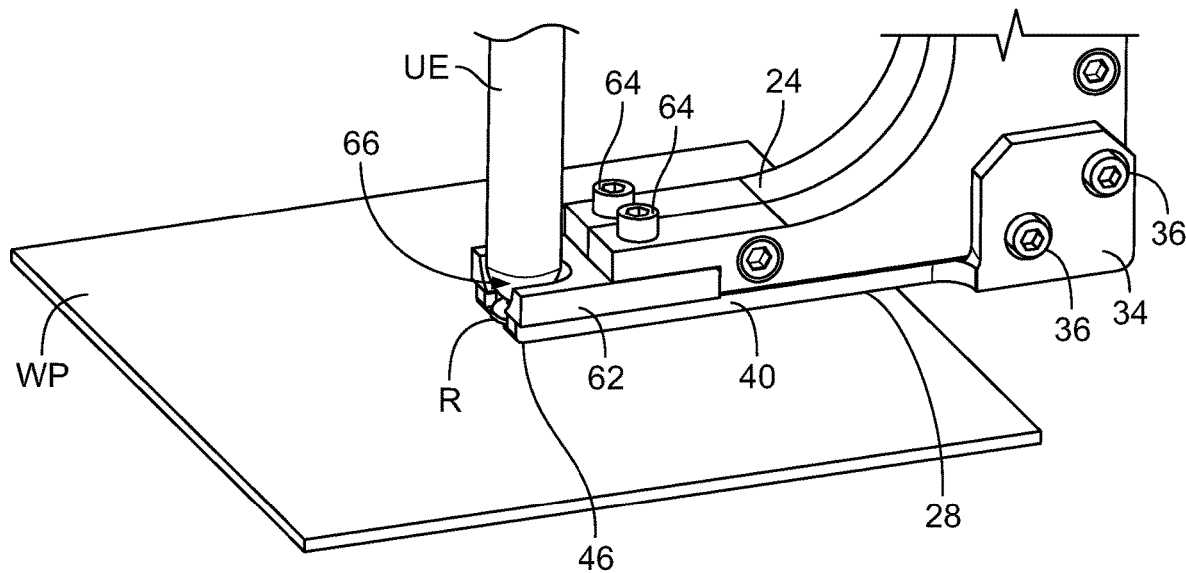
FIG. 6 illustrates a close-up view of portions of the rivet feed system and welding apparatus shown in FIG. 1.
Figure 7:
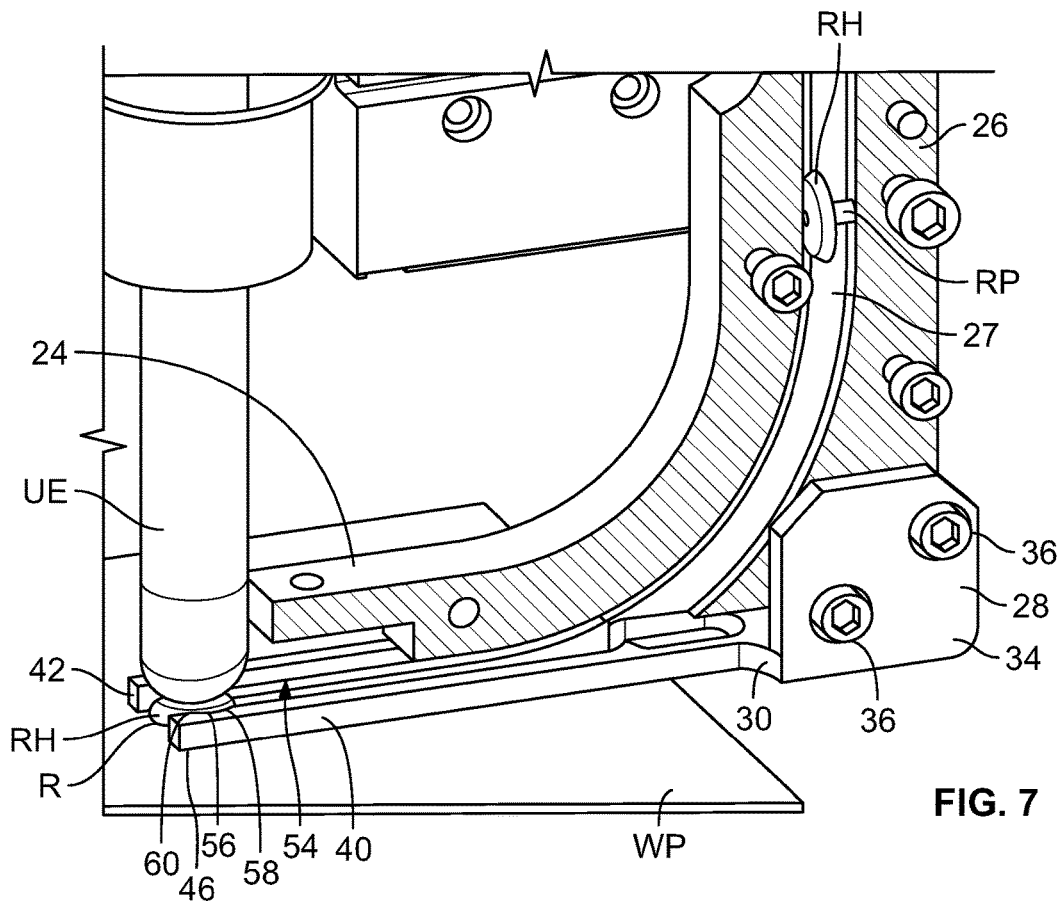
FIG. 7 illustrates a sectional view of a portion of the rivet feed system shown in FIG. 5.

Referring now to FIGS. 1 through 4, in an embodiment, the rivet feed system 10 includes a feeding block 28 attached to the bottom portion 24 of the feed body 16. Referring to FIGS. 3 and 4, in an embodiment, the feeding block 28 includes a base 30 having a pair of mounting brackets 32, 34 extending outwardly for mounting the feeding block 28 to the bottom portion 24 of the feed portion 12 by fasteners 36 (which are shown in FIGS. 6 and 7). A pair of feed fingers 38, 40 extends longitudinally from the base 30 and are opposed and spaced apart from one another, forming a space 42 therebetween. In an embodiment, and as will be further discussed in detail below, the feed fingers 38, 40 are adapted to flex laterally and apart from one another (i.e., away from the space 42). Each of the feed fingers 38, 40 includes a first end 44 formed integrally with the base 30 and a free, second end 46 opposite the first end 44. Each of the feed fingers 38, 40 includes an inner wall 48 and a lower wall 50. The lower wall 50 of each of the feed fingers 38, 40 includes a ramped portion 52 located proximate to the first end 44. The inner wall 48 and the lower wall 50 of each of the feed fingers 38, 40 cooperate to form a track 54 extending from the ramped portion 52 to the second end 46. In an embodiment, when the feeding block 28 is mounted to the feed body 16, the track 54 is adjacent to and contiguous with the feed track 27 of the feed body 16.

Proximate to the second end 46, the inner wall 48 of each of the feed fingers 38, 40 includes an inner guiding diameter portion 56, which forms an anti-return point 58 at one end thereof and a stop point 60 at the other end thereof. In an embodiment, the anti-return points 58 and the stop points 60 cooperate to act as a retention means for rivets R, and are positioned such that one of the rivets R may be held in position therebetween. In other embodiments, the feed body 16 includes a retention detent or a leaf spring that provides an anti-return feature, either rather than or in addition to the anti-return points 58. In an embodiment, the width between the inner guiding diameter portions 56 is narrower than the width of between the inner walls 48 of the feed fingers 38, 40. As to be discussed in greater detail below, the fingers 38, 40 are adapted to receive and maintain in position one of the rivets R for welding to a workpiece WP. The inner guiding diameter portion 56, the anti-return point 58, and the stop point 60 thereby cooperate to define a retention point at which one of the rivets R may be retained prior to fastening.

Figure 5:
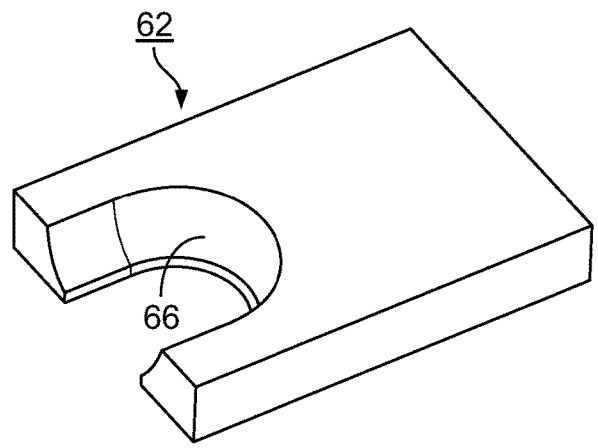
FIG. 5 illustrates a top perspective view of a finger cover employed by the rivet feed system shown in FIG. 2.

Referring now to FIGS. 5 and 6, in an embodiment, the rivet feed system 10 includes a finger cover 62, which is mounted to the second end 20 of the feed body 16 by fasteners 64. The finger cover 62 is positioned on top of the feed fingers 38, 40 of the feeding block 28 at the second ends 46 thereof. In an embodiment, the finger cover 62 includes a bowl-shaped cavity 66 that is aligned with the guiding diameter portions 56 of the feed fingers 38, 40, and is sized and shaped to receive a tip of the upper welding electrode UE.

Referring now to FIGS. 5 through 7, in an embodiment, a rivet R includes a disc-shaped head RH and a central pin RP (shown in FIG. 7) extending therefrom. When the rivet feed system 10 is in operation, rivets R are fed into the portion of the feed track 27 located at the first end 18 of the feed body 16 with air pressure applied by a further device (not shown). In an embodiment, the rivets R are fed one at a time. In other embodiments, the rivets R may be fed in a stack. In an embodiment, each rivet R travels along the feed track 27 as it passes through each of the portions 24, 26, 28 of the feed body 16, with the head RH of the rivet R sliding along the feed track 27 and the pin RP being positioned in the associated space within the track. When the rivet R reaches the bottom portion 24 of the feed body 16 (i.e., the end of the feed track 27), it leaves the feed track 27, travels along the track 54 formed by the feed fingers 38, 40, and stops at the ends 46 of the feed fingers 38, 40. As shown in FIGS. 2 and 6, motion along the Y-axis and Z-axis is used to move the feeding block 28 down and over so that the rivet R is positioned under the tip of the upper welding electrode UE. Motion along the Y-axis and Z-axis may be provided by any type of linear actuator. In an embodiment, the linear actuator is a pneumatic actuator.

In an embodiment, the feed fingers 38, 40 employ a momentum-based retention system. In this regard, the rivet R travels through the feed body 18 and along the feed track 27 at a relatively high velocity (i.e., as induced by air pressure that feeds the rivet R into the feed track 27, as described above). The velocity of the rivet R is such that when the rivet R engages the track 54 of the feeding block 28, the momentum of the rivet R causes the feed fingers 38, 40 to flex open laterally and outwardly (i.e., away from the space 42) as the rivet R passes the anti-return points 58 on the feed fingers 38, 40. However, the momentum of the rivet R is not high enough for the feed fingers 38, 40 to flex apart from one another to such an extent that the rivet R is able to travel completely past the second ends 46 of the feed fingers 38, 40. This is the case because the width between the inner guiding diameter portions 56 of the feed fingers 38, 40 is narrower than the width between the inner walls 48. As a result, more force than is provided due to the momentum of the rivet R would be required to flex the feed fingers 38, 40 apart from one another to a great enough extent to allow the rivet R to travel past the second ends 46 of the feed fingers 38, 40. Consequently, the rivet R is stopped by the stop points 60 of the feed fingers 38, 40 and is prevented from traveling completely past the second ends 46 of the feed fingers 38, 40. When the rivet R has reached the stop points 60, it is nestled within the guiding diameter portions 56 of the feed fingers 38, 40, and is in position and ready to be fed under the upper welding electrode UE by the Y-axis and Z-axis motions of the feeding block 28.

The electrode UE of the welding arm UA is positioned to pin the rivet R to the workpiece WP. In an embodiment, the workpiece WP can be steel, aluminum or carbon fiber. Once the rivet R is pinned to the workpiece WP by the electrode UE, the feed portion 12 is retracted in the directions of the Y-axis and Z-axis to leave the rivet R behind. Current is applied by the electrodes UE, LE to weld the rivet R to the workpiece WP. Afterwards, the feed portion 12 is moved to the next location to be riveted, next rivet R is fed into the feed portion 12 with pressurized air, and the cycle repeats.

The rivet feed system 10 may accommodate rivets R having various depths of the rivet pin RP without the need to change the feed portion 12. In an embodiment, the rivet feed system 10 is used for resistance spot weld rivets. In other embodiments, the rivet feed system 10 can be utilized for other types of rivets or fasteners.

It should be understood that the embodiments described herein are merely exemplary and that a person skilled in the art may make many variations and modifications without departing from the spirit and scope of the invention. All such variations and modifications are intended to be included within the scope of the invention as exemplified by the appended claims.

The invention claimed is:

1. A fastener feed apparatus, comprising:
a mounting portion; and
a feed portion attached to the mounting portion, the feed portion including
a feed body having a first end, a second end spaced from the first end, and a track extending from the first end to the second end, the track being sized and shaped to enable conveyance of a fastener from the first end to the second end, and
a feed block attached to the second end of the feed body and including a body and a pair of feed fingers extending from the body, each of which includes a first end formed integrally with the body and a second end opposite the first end of the feed finger such that the feed fingers are moveable between a relaxed position, in which the feed fingers are juxtaposed with one another, and a biased position, in which the feed fingers are resiliently biased away from one another at the second ends of the feed fingers, a track formed between the feed fingers, the track of the feed block including a first end adjacent the first ends of the feed fingers and a second end adjacent the second ends of the feed fingers, the track of the feed block being sized and shaped to convey the fastener from the first end of the track of the feed block to the second end of the track of the feed block, the track of the feed block being aligned with the track of the feed body, the second end of the track of the feed block including a retention area, and the feed fingers being sized and shaped to enable retention of the fastener at the retention area,
wherein the feed fingers, when in their biased positions, provide a lateral force against the fastener to enable retention of the fastener at the retention area and prevent the fastener from traveling past the second ends of the feed fingers.

2. The fastener feed apparatus of claim 1, wherein each of the feed fingers of the feed block includes a guiding portion located proximate to the second end thereof, and wherein the guiding portions define a first distance therebetween.

3. The fastener feed apparatus of claim 2, wherein the retention area of the track of the feed block includes the guiding portions.

4. The fastener feed apparatus of claim 3, wherein each of the feed fingers of the feed block includes a wall located proximate to the first end thereof, wherein the walls of the feed fingers face one another, wherein the walls of the feed fingers define a second distance therebetween, and wherein the second distance is greater than the first distance.

5. The fastener feed apparatus of claim 4, wherein each of the feed fingers of the feed block includes a stop located proximate to the guiding portions of the feed fingers and intermediate the guiding portions and the second ends of the feed fingers, and wherein the stops define a third distance therebetween.

6. The fastener feed apparatus of claim 5, wherein the third distance is less than the first distance.

7. The fastener feed apparatus of claim 5, wherein the feed fingers are sized and shaped to prevent them from biasing away from one another to an extent such that the fastener is free to pass between the stops of the feed fingers when the fastener impacts the stops after traveling along the track of the feed body from the first end of the feed body to the second end of the feed body and along the track of the feed block from the first end of the feed block to the second end of the feed block.

8. The fastener feed apparatus of claim 7, wherein the feed fingers are sized and shaped so as to enable them to resiliently bias away from one another to an extent such that the fastener is permitted to pass between the stops of the feed fingers when the feed portion is operated to move away from a workpiece along first and second axes thereof.

9. The fastener feed apparatus of claim 3, wherein each of the feed fingers of the feed block includes an anti-return area located proximate to the guiding portions and intermediate the guiding portions and the first ends of the feed fingers, and wherein the anti-return areas of the feed fingers define a fourth distance therebetween.

10. The fastener feed apparatus of claim 9, wherein the fourth distance is less than the first distance.

11. The fastener feed apparatus of claim 9, wherein the feed fingers are sized and shaped so as to allow them to resiliently bias away from one another to an extent such that the fastener is permitted to pass between the anti-return areas of the feed fingers.

12. The fastener feed apparatus of claim 1, wherein the feed portion includes a finger cover overlaying the second ends of the feed fingers.

13. The fastener feed apparatus of claim 12, wherein the finger cover includes a bowl-shaped cavity overlaying the retention area of the feed block.

14. The fastener feed apparatus of claim 13, wherein the cavity is sized and shaped to receive a first fastening arm of a fastening apparatus.

15. The fastener feed apparatus of claim 1, further comprising an actuator configured to move the feed portion relative to the mounting portion.

16. The fastener feed apparatus of claim 1, wherein the fastener includes a rivet.

17. The fastener feed apparatus of claim 1, wherein the fastener includes a plurality of rivets stacked among one another.

18. A fastener feed apparatus, comprising:
a feed body having a first end, a second end spaced from the first end, and a track extending from the first end to the second end, the track being sized and shaped to enable conveyance of a fastener from the first end to the second end, and a feed block attached to the second end of the feed body and including a body and a pair of feed fingers extending from the body, each of which includes a first end formed integrally with the body and a second end opposite the first end of the feed finger, a track formed between the feed fingers, the track of the feed block including a first end adjacent the first ends of the feed fingers and a second end adjacent the second ends of the feed fingers such that the feed fingers are moveable between a relaxed position, in which the feed fingers are juxtaposed with one another, and a biased position, in which the feed fingers are resiliently biased away from one another at the second ends of the feed fingers, the track of the feed block being sized and shaped to convey the fastener from the first end of the track of the feed block to the second end of the track of the feed block, the track of the feed block being aligned with the track of the feed body, the second end of the track of the feed block including a retention areas, and the feed fingers being sized and shaped to enable retention of the fastener at the retention areas, and wherein the feed fingers, when in their biased position, provide a lateral force against the fastener to enable retention of the fastener at the retention area and prevent the fastener from traveling past the second ends of the feed fingers.

19. The fastener feed apparatus of claim 18, wherein each of the feed fingers of the feed block includes a guiding portion located proximate to the second end thereof, and wherein the guiding portions define a first distance therebetween.

20. The fastener feed apparatus of claim 19, wherein the retention area of the track of the feed block includes the guiding portions.

21. The fastener feed apparatus of claim 20, wherein each of the feed fingers of the feed block includes a wall located proximate to the first end thereof, wherein the walls of the feed fingers face one another, wherein the walls of the feed fingers define a second distance therebetween, and wherein the second distance is greater than the first distance.

22. The fastener feed apparatus of claim 21, wherein each of the feed fingers of the feed block includes a stop located proximate to the guiding portions of the feed fingers and intermediate the guiding portions and the second ends of the feed fingers, and wherein the stops define a third distance therebetween.

23. The fastener feed apparatus of claim 22, wherein the third distance is less than the first distance.

24. The fastener feed apparatus of claim 22, wherein the feed fingers are sized and shaped to prevent them from biasing away from one another to an extent such that the fastener is free to pass between the stops of the feed fingers when the fastener impacts the stops after traveling along the track of the feed body from the first end of the feed body to the second end of the feed body and along the track of the feed block from the first end of the feed block to the second end of the feed block.

25. The fastener feed apparatus of claim 24, wherein the feed fingers are sized and shaped so as to enable them to resiliently bias away from one another to an extent such that the fastener is permitted to pass between the stops of the feed fingers when the feed portion is operated to move away from a workpiece along first and second axes thereof.

26. The fastener feed apparatus of claim 20, wherein each of the feed fingers of the feed block includes an anti-return area located proximate to the guiding portions and intermediate the guiding portions and the first ends of the feed fingers, and wherein the anti-return areas of the feed fingers define a fourth distance therebetween.

27. The fastener feed apparatus of claim 26, wherein the fourth distance is less than the first distance.

28. The fastener feed apparatus of claim 26, wherein the feed fingers are sized and shaped so as to allow them to resiliently bias away from one another to an extent such that the fastener is permitted to pass between the anti-return areas of the feed fingers.

29. The fastener feed apparatus of claim 18, further comprising a finger cover overlaying the second ends of the feed fingers.

30. The fastener feed apparatus of claim 29, wherein the finger cover includes a bowl-shaped cavity overlaying the retention area of the feed block.

31. The fastener feed apparatus of claim 30, wherein the cavity is sized and shaped to receive a first fastening arm of a fastening apparatus.

32. The fastener feed apparatus of claim 18, further comprising an actuator configured to move the feed portion.

33. The fastener feed apparatus of claim 18, wherein the fastener includes a rivet.

34. The fastener feed apparatus of claim 18, wherein the fastener includes a plurality of rivets stacked among one another.

* * * * *